(12) United States Patent
Shannon et al.

(10) Patent No.: US 11,396,857 B2
(45) Date of Patent: Jul. 26, 2022

(54) SAFELY INITIATING AN AUTONOMOUS VEHICLE RIDE

(71) Applicant: GM Cruise Holdings LLC, San Francisco, CA (US)

(72) Inventors: Jacqueline Shannon, Corte Madera, CA (US); Stephanie Olivia Engle, San Francisco, CA (US); Albert Boniske, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/401,603

(22) Filed: Aug. 13, 2021

(65) Prior Publication Data

US 2021/0372355 A1 Dec. 2, 2021

Related U.S. Application Data

(63) Continuation of application No. 16/654,492, filed on Oct. 16, 2019, now Pat. No. 11,111,895.

(51) Int. Cl.
*G06F 1/00* (2006.01)
*F02N 11/08* (2006.01)
*B60W 50/14* (2020.01)
*G05D 1/02* (2020.01)

(52) U.S. Cl.
CPC ......... *F02N 11/0822* (2013.01); *B60W 50/14* (2013.01); *G05D 1/021* (2013.01); *B60W 2050/146* (2013.01)

(58) Field of Classification Search
CPC ....... F02D 41/00; F02D 41/24; F02D 41/2425
USPC ................................................. 701/102, 115
See application file for complete search history.

(56) References Cited

U.S. PATENT DOCUMENTS

| | | | |
|---|---|---|---|
| 10,311,704 B1 | 6/2019 | Xu et al. | |
| 10,464,577 B1 | 11/2019 | Shannon et al. | |
| 10,562,541 B1 | 2/2020 | Shannon et al. | |
| 10,562,542 B1 | 2/2020 | Shannon et al. | |

(Continued)

FOREIGN PATENT DOCUMENTS

WO 2015041593 A1 3/2015

OTHER PUBLICATIONS

Constine J., "Uber is Now Testing Pickup Points," TechCrunch, Jul. 8, 2015, 8 Pages, XP055391639 Retrieved from the Internet: URL: https://techcrunch.com/2015/07/08/uber-suggested-pickup-points/, [retrieved on Jul. 18, 2017].

(Continued)

*Primary Examiner* — John Kwon
(74) *Attorney, Agent, or Firm* — Polsinelli, PC

(57) ABSTRACT

An autonomous vehicle having a user interface and a computing system that is in communication with the user interface. The computing system may have at least one processor and at least one memory that stores computer-executable instructions. When executed by the at least one processor, the instructions may cause the at least one processor to output information through the user interface to inform the passenger of an action that the passenger needs to enact prior to the autonomous vehicle beginning to move and determine, based upon an occurrence of the action that the passenger needs to enact, whether the autonomous vehicle is permitted to begin moving.

20 Claims, 4 Drawing Sheets

(56) References Cited

U.S. PATENT DOCUMENTS

| | | | |
|---|---|---|---|
| 10,730,530 | B2 | 8/2020 | Shannon et al. |
| 11,001,199 | B1* | 5/2021 | Galliano, III ............ H04W 4/02 |
| 2017/0178269 | A1 | 6/2017 | McKinnon et al. |
| 2018/0050626 | A1 | 2/2018 | Delp et al. |
| 2018/0074501 | A1* | 3/2018 | Boniske ............... G05D 1/0088 |
| 2018/0209803 | A1 | 7/2018 | Rakah et al. |
| 2018/0229587 | A1 | 8/2018 | Gao et al. |
| 2019/0054926 | A1 | 2/2019 | Wasekura |
| 2019/0056741 | A1* | 2/2019 | Zych ..................... B60W 30/09 |
| 2020/0051001 | A1 | 2/2020 | Donnelly |
| 2020/0065931 | A1 | 2/2020 | Engle et al. |
| 2020/0160709 | A1 | 5/2020 | Ramot et al. |
| 2021/0115889 | A1* | 4/2021 | Shannon ............. F02N 11/0822 |

OTHER PUBLICATIONS

International Search Report and Written Opinion for International Application No. PCT/US2019/068337, dated Jul. 1, 2020, 10 pages.

\* cited by examiner

SAFELY INITIATING AN AUTONOMOUS VEHICLE RIDE

CROSS-REFERENCE TO RELATED APPLICATIONS

This application is a continuation of U.S. application Ser. No. 16/654,492, filed on Oct. 16, 2019, entitled, SAFELY INITIATING AN AUTONOMOUS VEHICLE RIDE, which is hereby expressly incorporated by reference in its entirety.

TECHNICAL FIELD

The present technology relates to starting an autonomous vehicle ride and more particularly to starting an autonomous vehicle ride with minimal passenger input.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

When an autonomous vehicle picks up a passenger, it is challenging for the autonomous vehicle to determine when it is safe for the autonomous vehicle to begin moving and/or driving. Furthermore, without explicit actions or directions from the passenger, the autonomous vehicle finds it challenging to determine when the passenger may be prepared for the autonomous vehicle to begin moving and/or driving. Human drivers may use their judgement and other senses to assess actions of the passenger and/or communicate directly with the passenger to determine when the passenger is ready for the vehicle to begin moving.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. For purposes of interpretation, it is to be understood that the usage of "and" may be used in place of "and/or." In some instances, well-known structures and devices are shown in block diagram form in order to facilitate describing one or more aspects. Further, it is to be understood that functionality that is described as being carried out by certain system components may be performed by more or fewer components than shown.

In general, a vehicle used for ridesharing will come into contact with many different passengers, many of which will have different behaviors, preferences, and belongings. In vehicles with human drivers, the human driver can use his or her judgement to determine when the passenger has completed all safety requirements for the vehicle to begin moving or driving (e.g. fastening their seatbelt, closing doors, etc.). Furthermore, the human driver can use his or her judgment or communicate directly with the passenger to determine when the passenger is ready for the vehicle to begin moving or driving (e.g. the driver asks the passenger if they're ready to go). For an autonomous vehicle having no human driver, it is challenging to make these determinations. Thus, this disclosed technology address the need in the art for an autonomous vehicle that safely initiate an autonomous vehicle ride or movement.

Figure 1:
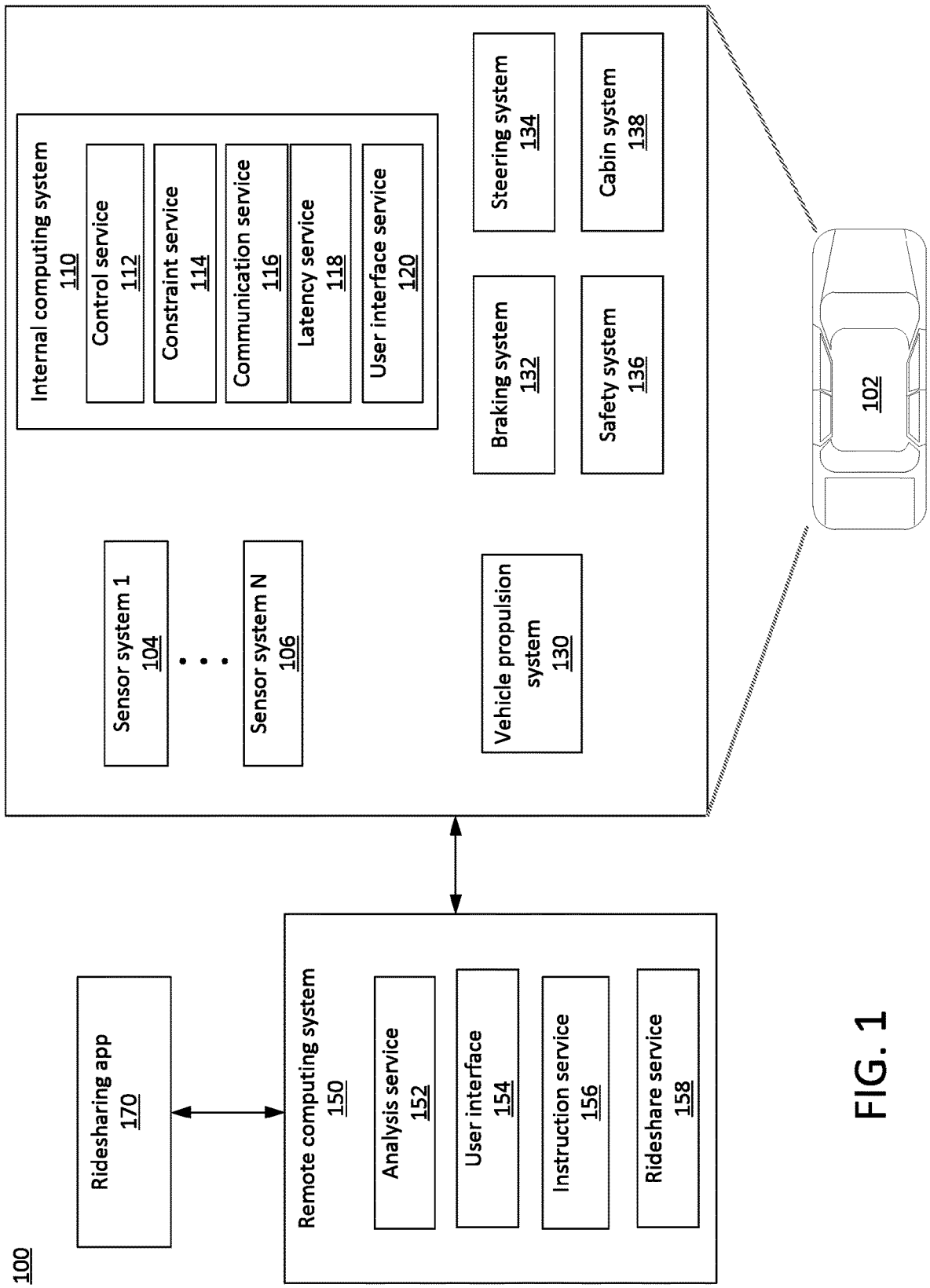
FIG. 1 shows an example of an example system for operating an autonomous vehicle in accordance with some aspects of the present technology.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 106, the braking system 108, the steering system 110, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
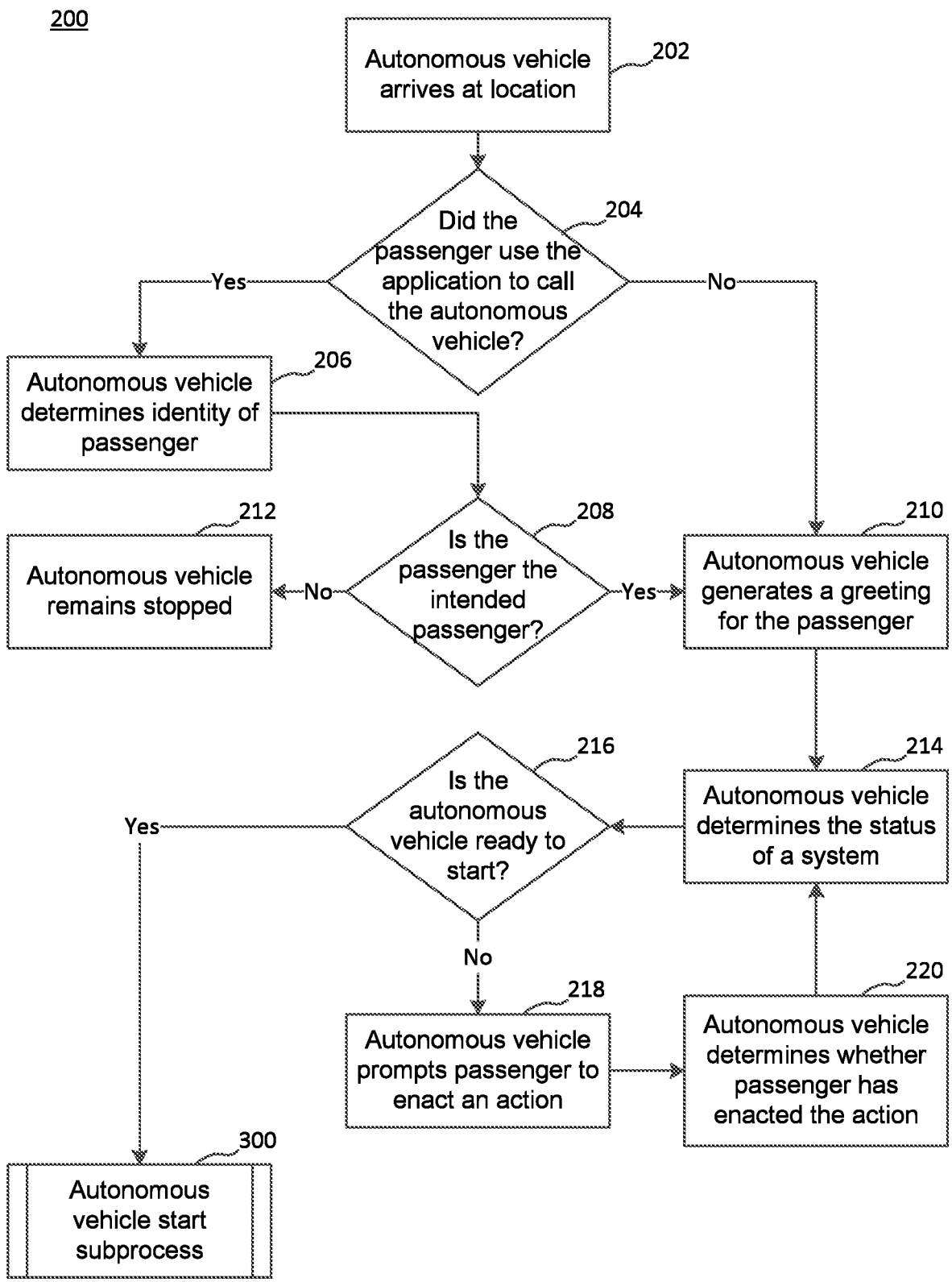
FIG. 2 is a flow diagram that illustrates an example process for initiating an autonomous vehicle ride in accordance with some aspects of the present technology.

FIG. 2 is a flow diagram that illustrates a process 200 for initiating an autonomous vehicle ride.

The process 200 begins at step 202, when the autonomous vehicle 102 arrives at a designated location.

At step 204, the autonomous vehicle 102 determines whether the autonomous vehicle 102 is waiting for the passenger.

If the autonomous vehicle 102 determines that the passenger requested the autonomous vehicle 102 through the ridesharing application 170, then the process proceeds to step 206. At step 206, the autonomous vehicle 102 determines an identity of a passenger attempting to enter the autonomous vehicle 102. In some embodiments, the autonomous vehicle 102 may use the sensor systems 104-106 to detect various physical traits of the passenger, including but not limited to, height, hair color, weight, approach speed towards the autonomous vehicle 102, etc. For example, prior to the passenger entering the autonomous vehicle 102, the autonomous vehicle 102 may use cameras of the sensor systems 104-106 to detect the height of the passenger as the passenger approaches the autonomous vehicle 102. As another example, after the passenger enters the autonomous vehicle 102, the autonomous vehicle 102 may use seat sensors of the sensor systems 104-106 to determine the weight of the passenger in the seat. In some embodiments, the autonomous vehicle 102 may request and/or receive information from the passenger that may further identify the passenger. For example, the autonomous vehicle 102 may request the passenger to input the last four digits of their phone number. In some embodiments, the autonomous vehicle 102 may request or prompt the passenger for an authentication code. The authentication code may have been sent to the autonomous vehicle 102 and the ridesharing application 170 of the passenger through the remote computing system 150. For example, the autonomous vehicle 102 may have a keypad disposed on an exterior of the autonomous vehicle 102 to receive the authentication code before the passenger enters the autonomous vehicle 102. Similarly, the autonomous vehicle 102 may use the user interface 120 to receive the authentication code after the passenger has entered the autonomous vehicle 102. The autonomous vehicle 102 may then authenticate the authentication code to determine whether the authentication code sent to the autonomous vehicle 102 and the authentication code sent to the ridesharing application 170 result in a match (i.e. if the passenger is the intended passenger).

At step 208, the autonomous vehicle 102 then determines whether the identity of the passenger attempting to enter the autonomous vehicle 102 matches the identity of the passenger who requested the autonomous vehicle 102 through the ridesharing application 170. In other words, the autonomous vehicle 102 determines whether the passenger is the intended passenger. In some embodiments, the autonomous vehicle 102 may match the physical traits detected above to detected physical traits of the passenger during previous ridesharing journeys. In some embodiments, upon receipt of matching information (e.g. authentication code, last four digits of phone number, etc.), the autonomous vehicle 102 may determine that the passenger attempting to enter the autonomous vehicle is indeed the passenger who requested the autonomous vehicle 102.

If the autonomous vehicle 102 determines that the passenger attempting to enter the autonomous vehicle 102 is the passenger who requested the autonomous vehicle 102, then the process continues to step 210. At step 210, the autonomous vehicle 102 generates information and/or a greeting for the passenger. It is further contemplated that the autonomous vehicle 102 may also customize and/or personalize the information and/or greeting so that the passenger is aware of who the autonomous vehicle 102 believes is boarding the autonomous vehicle 102 and consequently verify the information themselves. In other words, the autonomous vehicle 102 may output personalized information for the passenger. In some embodiments, the autonomous vehicle 102 may also output an intended destination so that the passenger may also verify the intended destination. For example, the autonomous vehicle 102 may say "Welcome aboard, John. We will head to the Golden Gate Bridge soon."

If, on the other hand, the autonomous vehicle 102 determines that the passenger attempting to enter the autonomous vehicle 102 is not the passenger who requested the autonomous vehicle 102, then the process moves to step 212. At step 212, the autonomous vehicle 102 remains stopped and outputs information notifying the passenger about a mismatch between the passenger attempting to enter the autonomous vehicle 102 and the passenger who requested the autonomous vehicle 102. In some embodiments, the autonomous vehicle 102 may prompt the passenger to re-enter information. For example, in embodiments that requested the last four digits of the passenger's phone number, the autonomous vehicle 102 may again prompt the passenger to enter the last four digits of the passenger's phone number. In some embodiments, if the passenger attempting to enter the autonomous vehicle 102 inputs mismatched information beyond a threshold number of instances, the autonomous vehicle 102 may enter a timeout state, in which the autonomous vehicle 102 locks down and/or remains locked down so that no passenger may access the autonomous vehicle 102.

Referring back to step 204, if the autonomous vehicle 102 determines that the passenger did not use the ridesharing application 170 to request the autonomous vehicle (e.g. requested at a stand or hailed the autonomous vehicle), then the process 200 proceeds to step 210. At step 210, as discussed above, the autonomous vehicle 102 generates a greeting for the passenger. In some embodiments, the autonomous vehicle 102 may determine the identity of the passenger (e.g. like in the discussion for step 206) and accordingly personalize the greeting as discussed above.

At step 214, the autonomous vehicle 102 determines a status of a system. The system may be one or more systems. For example, the autonomous vehicle 102 may determine whether the seatbelts are fastened and/or whether doors to the autonomous vehicle 102 are properly closed. In some embodiments, the autonomous vehicle 102 may utilize the sensor systems 104-106 to selectively check the systems. For example, the autonomous vehicle 102 may utilize seat weight sensors and/or cameras to determine which seats are occupied and accordingly only determine whether the seatbelts for occupied seats are fastened, instead of all seatbelts for all seats.

At step 216, the autonomous vehicle 102 determines whether the autonomous vehicle 102 is ready to start, begin moving, and/or initiate motion. More specifically, the autonomous vehicle 102 determines whether the autonomous vehicle 102 is ready to initiate motion based upon the status of the system. For example, the autonomous vehicle 102 may determine that the autonomous vehicle 102 is ready to start because the seatbelts to occupied seats are fastened and all doors to the autonomous vehicle 102 are closed.

If the autonomous vehicle 102 determines that the autonomous vehicle 102 is ready to start and/or begin moving, then the process 200 continues to an autonomous vehicle start sub-process 300.

If the autonomous vehicle 102 determines that the autonomous vehicle 102 is not ready to start and/or begin moving, then the process 200 moves to step 218. In step 218, the autonomous vehicle 102 prompts the passenger to enact an action. For example, the autonomous vehicle 102 may output information to prompt the passenger to fasten their seatbelt. In some embodiments, the action may be providing confirmation to the autonomous vehicle 102 that the passenger is ready for the autonomous vehicle 102 to initiate motion. In some embodiments, the autonomous vehicle 102 may prompt the passenger to enact multiple actions. For example, the autonomous vehicle 102 may prompt the passenger to fasten their seatbelt and close the doors. In other words, the autonomous vehicle 102 may determine the statuses of multiple systems and prompt the user to enact all necessary actions at once. In some embodiments, the prompt may take a form of a message to the passenger stating that the action is a pre-requisite for the autonomous vehicle 102 to initiate motion. In other words, the autonomous vehicle 102 may output a message stating that the passenger needs to enact the action prior to the autonomous vehicle 102 initiates motion.

At step 220, the autonomous vehicle 102 determines whether the passenger has enacted the action. More specifically, the autonomous vehicle 102 may use the sensor systems 104-106 to determine whether the passenger has enacted the action. For example, the autonomous vehicle 102 may have requested that the passenger stored their baggage underneath the seat. The autonomous vehicle 102 may then use a camera to detect whether the passenger has placed the baggage underneath the seat. As another example, the autonomous vehicle 102 may request the passenger to fasten their seatbelt and accordingly determine, using seatbelt sensors, whether the passenger has fastened their seatbelt.

In either scenario, (i.e. if the autonomous vehicle 102 determines that the passenger has not enacted the requested action and if the autonomous vehicle 102 determines that the passenger has enacted the requested action), the process 200 returns to step 214, where the autonomous vehicle determines the status of the system. For example, the autonomous vehicle 102 may determine that the status of seatbelts is unfastened (i.e. step 216) and accordingly prompt the passenger to fasten the seatbelts (i.e. step 218). The autonomous vehicle 102 may then determine whether the passenger has fastened the seatbelts (i.e. step 220). Then the autonomous vehicle 102 may check the statuses of other systems, such as whether the doors are closed (i.e. step 214).

Figure 3:
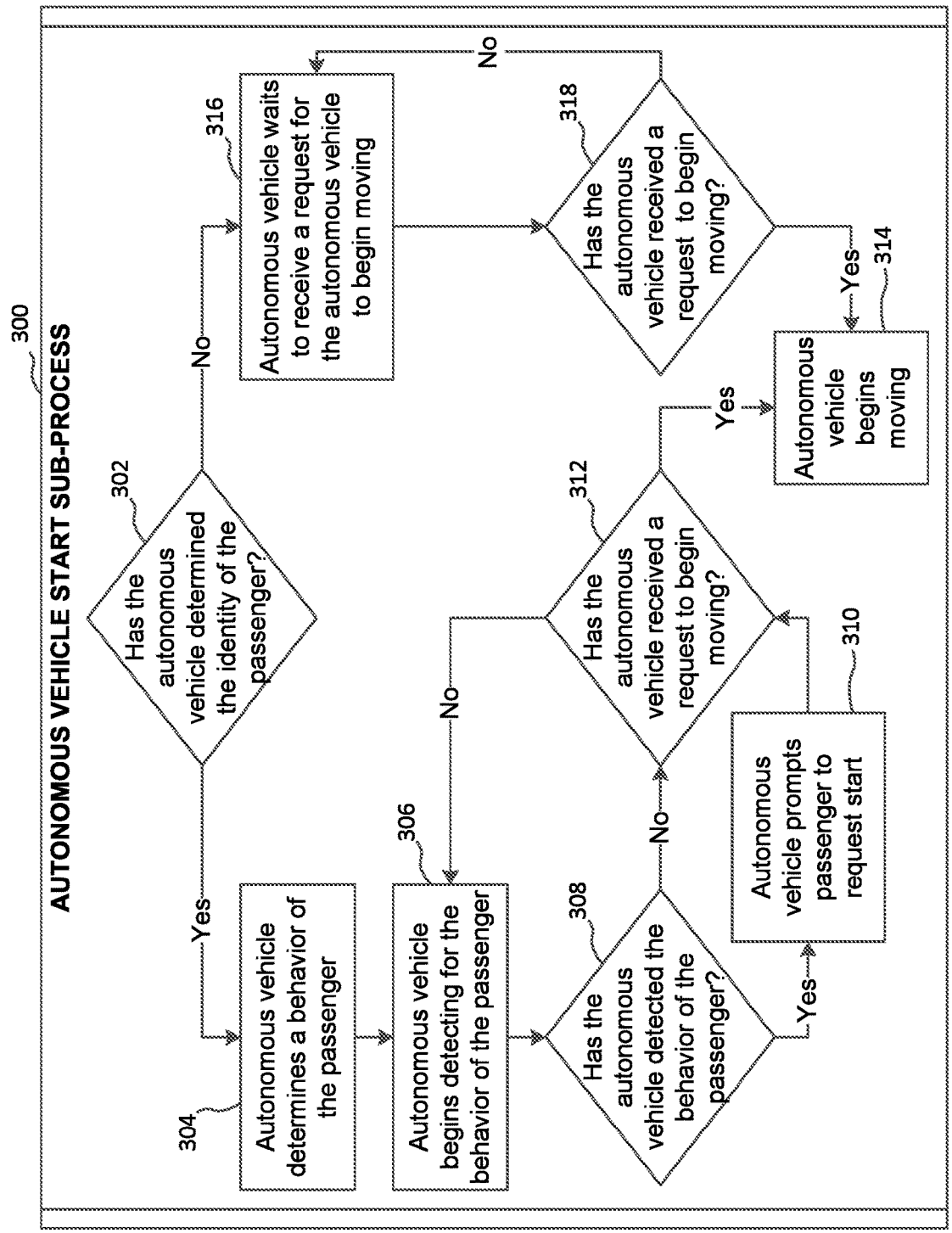
FIG. 3 is flow diagram that illustrates an example process for starting an autonomous vehicle ride in accordance with some aspects of the present technology.

FIG. 3 is flow diagram that illustrates the autonomous vehicle start sub-process 300 for starting an autonomous vehicle drive or movement.

The sub-process starts at step 302, when the autonomous vehicle 102 determines whether the autonomous vehicle 102 has determined the identity of the passenger.

If the autonomous vehicle 102 determines that the autonomous vehicle has determined the identity of the passenger, then the autonomous vehicle start sub-process 300 continues to step 304. At step 304, the autonomous vehicle 102 determines a behavior of the passenger. More specifically, the behavior of the passenger is indicative of a readiness of the passenger for the autonomous vehicle 102 to begin moving. In other words, the behavior is typically conducted when the passenger is ready and/or prepared for the autonomous vehicle 102 to begin moving. In some embodiments, the autonomous vehicle 102 may determine this behavior from records of past trips taken by the passenger. The records of past trips may have data showing similar the passenger conducting similar behavior prior to requesting the autonomous vehicle 102 to begin moving. For example, the autonomous vehicle 102 may determine that the passenger typically places a beverage in a cupholder when the passenger is ready and/or prepared for the autonomous vehicle 102 to begin moving. In some embodiments, the autonomous vehicle 102 may determine this behavior as a general behavior of a large number of passengers. For example, many passengers may look up and forward after fastening their seatbelt when they are prepared for the autonomous vehicle 102 to begin moving. In some embodiments, the autonomous vehicle 102 may determine more than one behavior that is typically indicative of the readiness of the passenger for the autonomous vehicle 102 to begin moving. Thus, the autonomous vehicle 102 may determine which of the behaviors is most strongly correlated to the passenger being ready for the autonomous vehicle 102 to begin moving. In some embodiments, the autonomous vehicle 102 may use multiple behaviors to determine and further confirm the passenger being ready for the autonomous vehicle 102 to begin moving.

At step 306, the autonomous vehicle 102 begins detecting for the behavior of the passenger. The autonomous vehicle 102 may utilize the sensor systems 104-106 to detect the behavior of the passenger. For example, the autonomous vehicle 102 may use a cabin camera to observe and detect when the passenger fastens their seatbelt and looks up and forward.

At step 308, the autonomous vehicle 102 determines whether it has detected the behavior of the passenger.

If the autonomous vehicle 102 determines that it has detected the behavior of the passenger, then the autonomous vehicle start sub-process 300 continues to step 310. At step 310, the autonomous vehicle 102 prompts the passenger to request the autonomous vehicle 102 to begin moving or ask the passenger whether the passenger is ready for the autonomous vehicle 102 to begin moving. For example, the autonomous vehicle 102 may prompt the passenger to press the physical Start Ride button or to say "Start the ride." As another example, the autonomous vehicle 102 may ask "Are you ready to start the ride?" for which the autonomous vehicle 102 may wait to receive a response. Afterwards, the autonomous vehicle start sub-process 300 continues to step 312, where the autonomous vehicle 102 determines whether it has received the request.

Referring back to step 308, if the autonomous vehicle 102 determines that it has not detected the behavior of the passenger, then the autonomous vehicle start sub-process 300 continues directly to step 312. At step 312, the autonomous vehicle 102 determines whether it has received a request to begin moving. For example, the passenger may explicitly say "Start the ride" or press a physical Start Ride button.

If the autonomous vehicle 102 has determined that it has not received a request to begin moving, then the autonomous vehicle start sub-process 300 continues to returns to step 306.

If the autonomous vehicle 102 has determined that it has received a request to begin moving, the autonomous vehicle start sub-process 300 also continues to step 314. At step 314, the autonomous vehicle 102 controls the autonomous vehicle 102 to initiate motion. In some embodiments, the autonomous vehicle 102 may also notify the passenger that the autonomous vehicle 102 will begin moving.

Referring back to Step 302, if the autonomous vehicle determines that it has not determined the identity of the passenger, then the autonomous vehicle start sub-process 300 continues to step 316. At step 316, the autonomous vehicle waits until it receives a request for the autonomous vehicle to begin moving. Like the request in step 308, the request may be the passenger explicitly saying "Start the ride" or pressing a physical Start Ride button. In some embodiments, the autonomous vehicle 102 may observe and detect for general behavioral indicators that a person is settled in and ready to have the autonomous vehicle 102 initiate motion. After the autonomous vehicle 102 detects the general behavioral indicators, the autonomous vehicle 102 may ask or prompt the passenger if they are ready for the autonomous vehicle 102 to initiate motion.

At step 318, the autonomous vehicle 102 determines whether it has received the request to begin moving.

If the autonomous vehicle 102 determines that it has not received the request to begin moving, the autonomous vehicle start sub-process 300 returns to step 316, where it waits until it receives a request for the autonomous vehicle 102 to begin moving.

If the autonomous vehicle 102 determines that it has received the request to begin moving, the autonomous vehicle start sub-process 300 continues to step 314, as defined above.

The order or sequence of the above process and sub-process is merely for explanatory purposes. One of ordinary skill in the art will understand and appreciate that many of the steps may be interchangeable and/or implemented in different points in time. For example, steps 308 and 310 may occur concurrently or in reverse order to yield a similar result.

It is further contemplated that the process 200 and the autonomous vehicle start sub-process 300 may be utilized multiple times for multiple passengers. For example, after the autonomous vehicle 102 picks up a passenger and embarks on a first journey, a second passenger may request the autonomous vehicle 102 to join a second journey similar to the first journey. Thus, the autonomous vehicle 102 may also pick up the second passenger during the first journey. In these situations, the autonomous vehicle 102 may display a notification through the user interface 120 to notify the passenger that the autonomous vehicle will pick up a second passenger. The autonomous vehicle 102 may then stop to pick up the second passenger. Then, the autonomous vehicle 102 may conduct process 200 and sub-process 300 to output information to the second passenger about a second action that the second passenger needs to enact. Again, the autonomous vehicle 102 may then detect using the sensor systems 104-106 the second action that the second passenger needs to enact. After detecting the occurrence of the second action performed by the second passenger, the autonomous vehicle 102 may then control the autonomous vehicle 102 to begin moving.

In some embodiments, the autonomous vehicle 102 may determine a projected amount of time the autonomous vehicle 102 is permitted to remain stationary. If the autonomous vehicle 102 determines that the projected amount of time the autonomous vehicle 102 is permitted to remain stationary is a short amount of time, then the autonomous vehicle 102 may initiate a rushed start so that the autonomous vehicle 102 does not exceed the projected amount of time the autonomous vehicle 102 is permitted to remain stationary. More specifically, the rushed start may detect the occurrence of the action(s) that the passenger needs to enact, but may be waiting for active or implied consent from the user. In some embodiments, the autonomous vehicle 102 may determine that, based on a profile of the user, the user has agreed to allow the autonomous vehicle 102 to begin moving as soon as all safety actions have been enacted. In other embodiments, the autonomous vehicle 102 may transmit an acoustic signal (e.g. "when you are ready to go, say 'ready'") to the user requesting permission to begin moving, and may receive an indication that the user is ready via an in-car display or a microphone. In some embodiments, the autonomous vehicle 102 may also output additional information after the autonomous vehicle 102 begins moving. For example, the autonomous vehicle 102 may state "Sorry for the rushed start, there is a strict time limit for remaining stationary in this area. We are now on our way to the Golden Gate Bridge."

Figure 4:
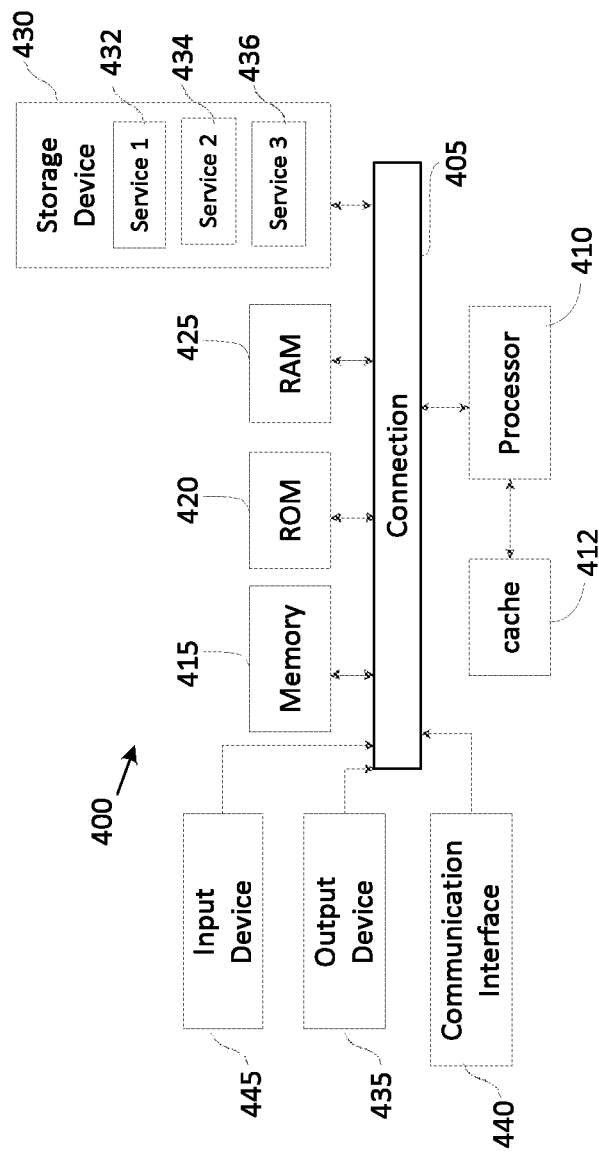
FIG. 4 shows an example of a system for implementing certain aspects of the present technology.

FIG. 4 shows an example of computing system 400, which can be for example any computing device making up internal computing system 110, remote computing system 150, (potential) passenger device executing rideshare app 170, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement, and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A computing system for safely initiating a vehicle, the system comprising:
   one or more processors; and
   a computer-readable medium comprising instructions stored therein, which when executed by the processors, cause the processors to perform operations comprising:
      receiving information associated with a behavior of at least one passenger, wherein the behavior of the at least one passenger is detected by one or more sensors;
      determining if the behavior of the at least one passenger is an indication of readiness of the at least one passenger for a vehicle to initiate operation; and
      sending a signal to initiate the operation in response to the indication of the readiness of the at least one passenger.

2. The computing system of claim 1, wherein the information associated with the behavior of the passenger comprises a posture of the at least one passenger within a cabin of the vehicle.

3. The computing system of claim 1, wherein the processors are further configured to perform operations comprising:
   displaying a notification on a user interface if the information associated with the behavior of the at least one passenger is not received within a predetermined time limit, wherein the notification includes a request to enact the behavior that is the indication of the readiness of the at least one passenger.

4. The computing system of claim 1, wherein the determining that the behavior of the at least one passenger is the indication of the readiness of the at least one passenger is based on records of past trips of the at least one passenger.

5. The computing system of claim 1, wherein the determining that the behavior of the at least one passenger is the indication of the readiness of the at least one passenger is based on a behavior of general public.

6. The computing system of claim 1, wherein the information associated with the behavior of the at least one passenger includes a first behavior and a second behavior, and wherein the processors are further configured to perform operations comprising:
   determining that a correlation between the first behavior and the indication of the readiness of the at least one passenger is stronger than a correlation between the second behavior and the indication of the readiness of the at least one passenger, wherein the sending the signal to initiate the operation of the vehicle is based on the first behavior.

7. The computing system of claim 1, wherein the at least one passenger is two or more passengers and wherein the sending the signal to initiate the operation of the vehicle includes sending the signal to initiate the operation if the behavior of each of the two or more passengers is the indication of the readiness of the each of the two or more passengers.

8. A method comprising:
receiving information associated with a behavior of at least one passenger, wherein the behavior of the at least one passenger is detected by one or more sensors;
determining if the behavior of the at least one passenger is an indication of readiness of the at least one passenger for a vehicle to initiate operation; and
sending a signal to initiate the operation in response to the indication of the readiness of the at least one passenger.

9. The method of claim 8, wherein the information associated with the behavior of the passenger comprises a posture of the at least one passenger within a cabin of the vehicle.

10. The method of claim 9, further comprising:
displaying a notification on a user interface if the information associated with the behavior of the at least one passenger is not received within a predetermined time limit, wherein the notification includes a request to enact the behavior that is the indication of the readiness of the at least one passenger.

11. The method of claim of 9, wherein the determining that the behavior of the at least one passenger is the indication of the readiness of the at least one passenger is based on records of past trips of the at least one passenger.

12. The method of claim of 8, wherein the determining that the behavior of the at least one passenger is the indication of the readiness of the at least one passenger is based on a behavior of general public.

13. The method of claim 8, wherein the information associated with the behavior of the at least one passenger includes a first behavior and a second behavior, the method further comprising:
determining that a correlation between the first behavior and the indication of the readiness of the at least one passenger is stronger than a correlation between the second behavior and the indication of the readiness of the at least one passenger, wherein the sending the signal to initiate the operation of the vehicle is based on the first behavior.

14. The method of claim 8, wherein the at least one passenger is two or more passengers and wherein the sending the signal to initiate the operation of the vehicle includes sending the signal to initiate the operation if the behavior of each of the two or more passengers is the indication of the readiness of the each of the two or more passengers.

15. A non-transitory computer-readable storage medium comprising instructions stored therein, which when executed by one or more processors, cause the processors to perform operations comprising:
receiving information associated with a behavior of at least one passenger, wherein the behavior of the at least one passenger is detected by one or more sensors;
determining if the behavior of the at least one passenger is an indication of readiness of the at least one passenger for a vehicle to initiate operation; and
sending a signal to initiate the operation in response to the indication of the readiness of the at least one passenger.

16. The non-transitory computer-readable storage medium of claim 15, wherein the information associated with the behavior of the passenger comprises a posture of the at least one passenger within a cabin of the vehicle.

17. The non-transitory computer-readable storage medium of claim 16, wherein the processors are further configured to perform operations comprising:
displaying a notification on a user interface if the information associated with the behavior of the at least one passenger is not received within a predetermined time limit, wherein the notification includes a request to enact the behavior that is the indication of the readiness of the at least one passenger.

18. The non-transitory computer-readable storage medium of claim 16, wherein the determining that the behavior of the at least one passenger is the indication of the readiness of the at least one passenger is based on records of past trips of the at least one passenger.

19. The non-transitory computer-readable storage medium of claim 15, wherein the determining that the behavior of the at least one passenger is the indication of the readiness of the at least one passenger is based on a behavior of general public.

20. The non-transitory computer-readable storage medium of claim 15, wherein the information associated with the behavior of the at least one passenger includes a first behavior and a second behavior, and wherein the processors are further configured to perform operations comprising:
determining that a correlation between the first behavior and the indication of the readiness of the at least one passenger is stronger than a correlation between the second behavior and the indication of the readiness of the at least one passenger, wherein the sending the signal to initiate the operation of the vehicle is based on the first behavior.

* * * * *